Jan. 2, 1934.  E. F. LOWEKE  1,941,563
HYDRAULIC BRAKE
Filed Aug. 2, 1930  3 Sheets-Sheet 1
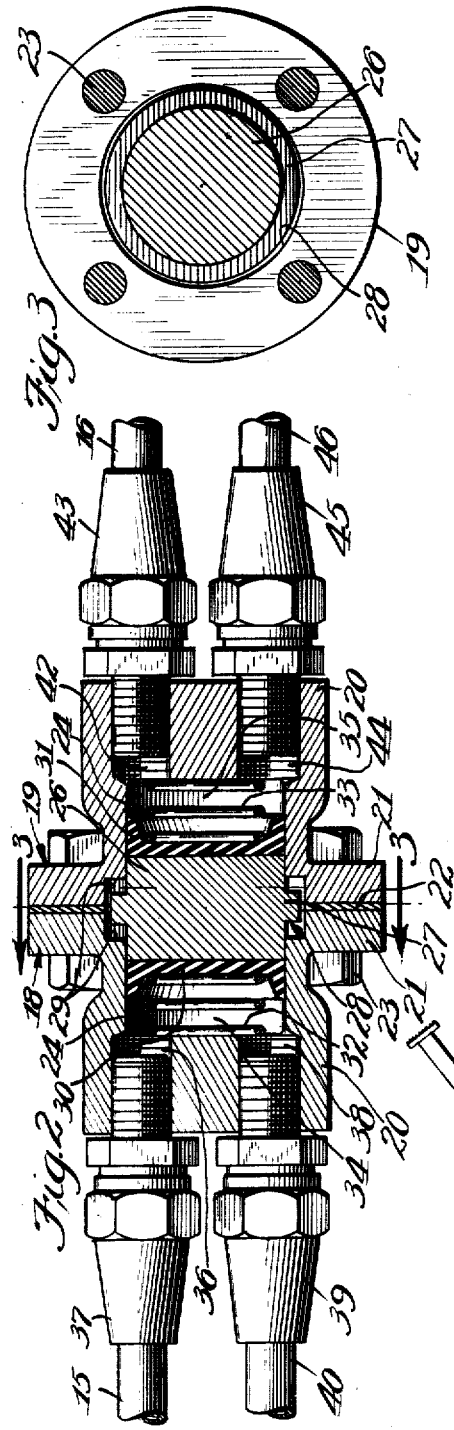
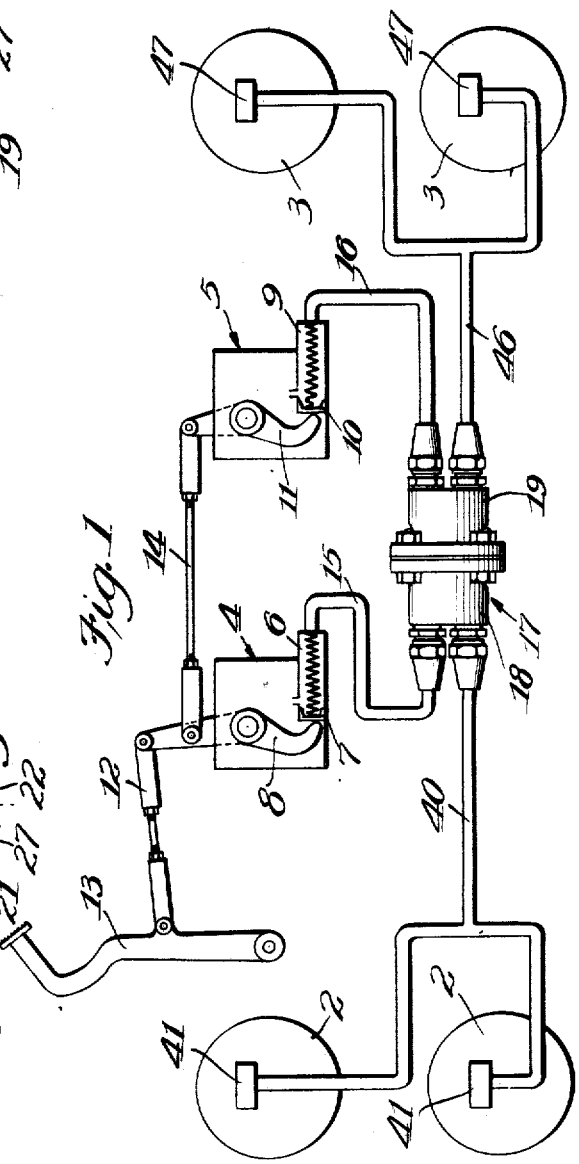
Inventor:
Erwin F. Loweke
By Williams, Bradbury, McCaleb
& Hinkle
Attys.

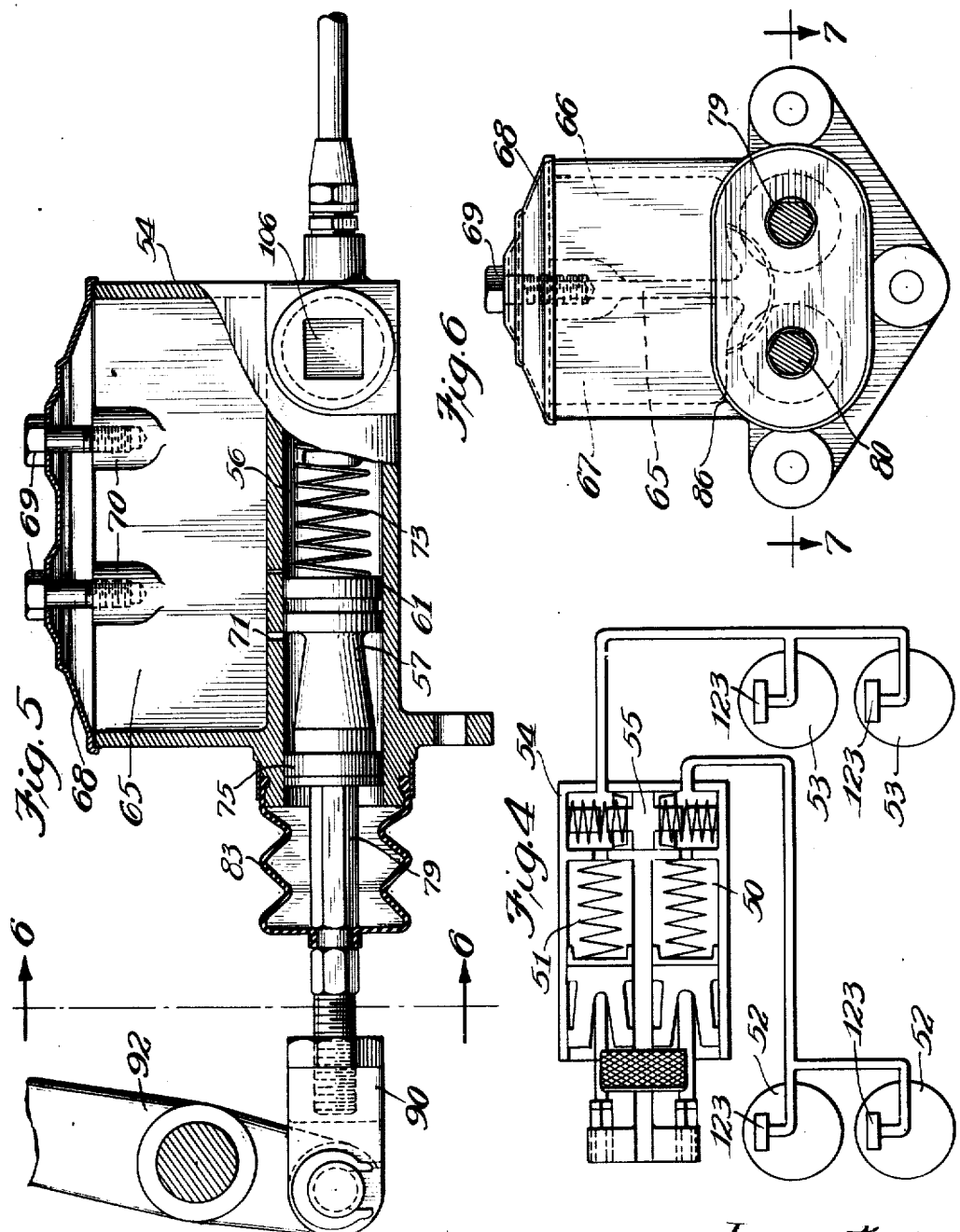

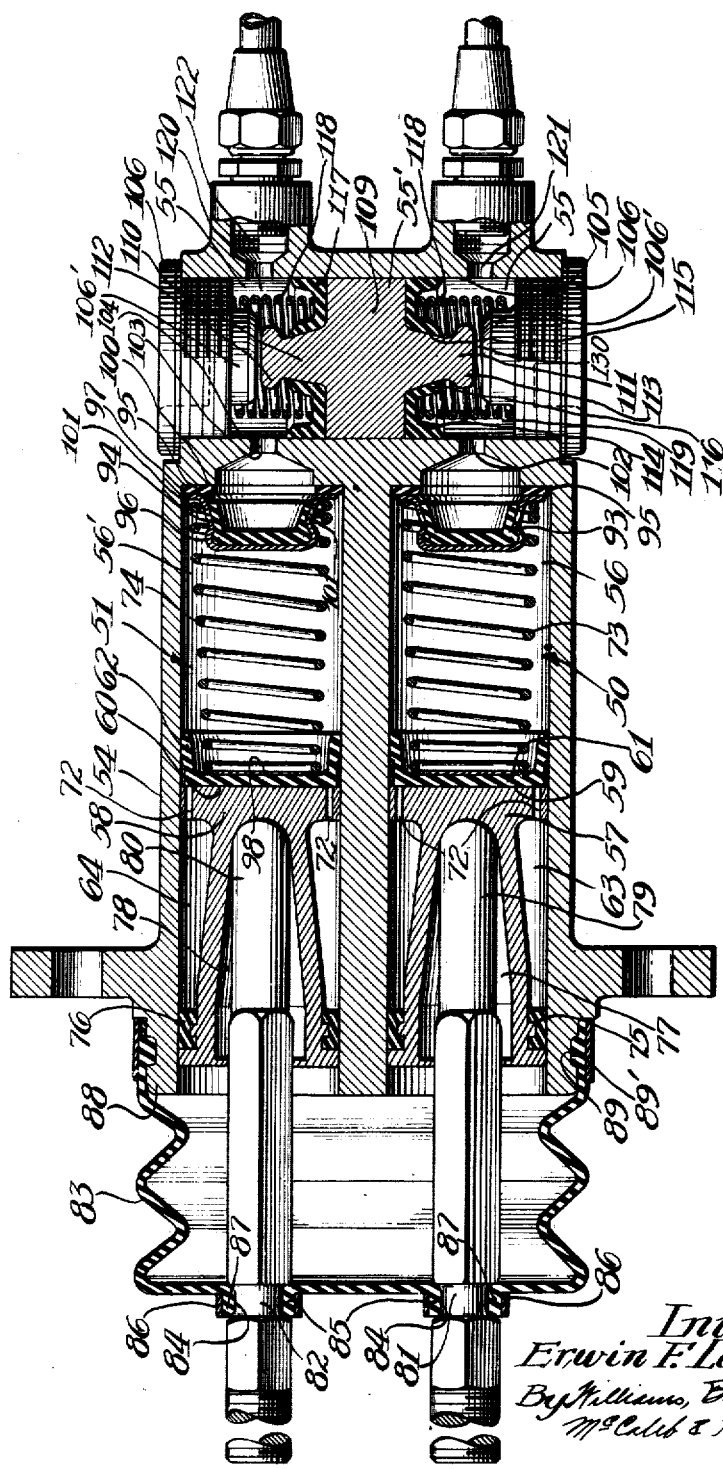

Patented Jan. 2, 1934

1,941,563

UNITED STATES PATENT OFFICE 1,941,563

HYDRAULIC BRAKE

Erwin F. Loweke, Detroit, Mich., assignor to Hydraulic Brake Company, Detroit, Mich., a corporation of California Application August 2, 1930. Serial No. 472,665

3 Claims. (Cl. 60—54.6)

This invention relates to hydraulic braking systems and more particularly to a system of the type applicable for use on a motor vehicle and has for its object the provision of apparatus for maintaining the proper pressures in a system of the above type in which a separate pressure system is used for the front and rear wheel brakes.

Another object of my invention is to provide a brake mechanism in which a plurality of pressure systems may be operated by a single operating means to effect the desired pressures in the several pressure systems.

A further object of my invention is the provision of apparatus common to the pressure producing devices of the several pressure systems which is effective to equalize varying pressures which may be produced in the several systems due to possible differential in adjustments between the front and rear wheel brakes.

A further object of my invention is the provision of a pressure producing device for each of the several systems whereby the failure or breakage of a conduit controlling the brakes of one pair of wheels will permit the other pressure producing device to remain in the system and operate in a normal manner.

The above features, as well as others not particularly pointed out, will be apparent in the following description.

For a more complete understanding of my invention reference may be had to the following description taken in conjunction with the accompanying drawings, in which like reference characters in the several views denote like parts, and in which:

Fig. 1 is a schematic representation embodying the invention showing a separate pressure mechanism for the front and rear wheel brakes of an automobile;

Fig. 2 is a medial sectional view of the equalizer cylinder of my invention illustrated in Fig. 1;

Fig. 3 is a sectional view along the line 3—3 of Fig. 2 looking in the direction of the arrows indicated thereon;

Fig. 4 is a schematic representation embodying a modified form of my invention showing the separate pressure devices for the front and rear wheel brakes and the equalizer cylinder contained within a single housing;

Fig. 5 is a side elevation partly in section of the housing of my invention illustrated in Figure 4 containing the pressure devices for the respective front and rear wheel brakes;

Fig. 6 is a sectional view along the line 6—6 of Fig. 5 looking in the direction of the arrow indicated thereon; and Fig. 7 is a sectional view along the line 7—7 of Fig. 4 looking in the direction of the arrow indicated thereon.

Referring now in detail to the invention as illustrated, and more particularly to Fig. 1, a hydraulic brake system for an automobile is shown in which the front wheel brakes 2 and the rear wheel brakes 3 are actuated by separate pressure devices 4 and 5 respectively. The pressure device 4 comprises a master cylinder 6 including a piston 7, which is reciprocated in the master cylinder to produce a pressure in the fluid system by means of a lever 8.

The pressure device 5 similarly comprises a master cylinder 9 including a piston 10 which is reciprocated therein to produce a fluid pressure by means of the lever 11. The lever 8 is connected through a link 12 to a manually operated foot pedal 13 and a link 14 connects the lever 11 of the pressure device 5 to the lever 8 so that upon the actuation of the common manually operated foot pedal 13 movement is transmitted to the lever 8 which in turn is transmitted to the lever 11 through the agency of the link 14.

The outlet ports of the respective master cylinders 6 and 9 are connected by suitable conduits 15 and 16 to an equalizer cylinder indicated generally by the reference character 17. The equalizer cylinder 17 preferably consists of two halves 18 and 19 which are similar and interchangeable and consist of cylindrical body portions 20 provided with annular flanges 21. The halves 18 and 19 are assembled to form the housing 17 by bolting together the flanges 21 with a gasket 22 interposed between the respective flanges 21 by means of the bolts 23. The respective halves 18 and 19 are provided with bores 24 which when assembled form a piston chamber.

A double ended piston 26 is positioned in the chamber and is provided with an enlarged annular shoulder 27 intermediate its ends and lies within an annular enlarged recess 28 formed by the counterbores 29 in the respective faces of the flanges 21 to permit a predetermined amount of movement of the piston 26 to the right or left under the influence of fluid pressure. Packing cups 30 and 31 are provided and maintained against the respective end faces of the piston 26 by means of the helical springs 32 and 33 to prevent leakage of fluid past the piston 26 from the respective fluid chambers 34 and 35. The conduit 15 extending from the master cylinder 6 and which controls the application of the front wheel brakes 2 is connected to the inlet port 36 of the chamber 34 by means of a suitable sleeve nut 37 and the outlet port 38 of the chamber 34 has connected thereto by means of a sleeve nut 39 a conduit 40 which leads to the brake cylinders 41 of the front wheel brakes 2. The conduit 16 extending from the outlet port of the master cylinder 5 and which controls the application of the rear wheel brakes 3 is connected to the inlet port 42 of the chamber 35 by means of a sleeve nut 43. The outlet port 44 of the chamber 35 has connected thereto by means of a sleeve nut 45 a conduit 46 which leads to the brake cylinders 47 of the rear wheel brakes 3.

When the foot pedal 13 is actuated the levers 8 and 11 are moved through the agency of the links 12 and 14 to move the pistons 7 and 10 in the respective master cylinders 6 and 9 to produce a pressure in the brake system. Assuming that the front and rear brakes are adjusted to take effect simultaneously, the application of the foot pedal 13 will produce a fluid pressure in the brake systems of the respective front and rear wheel brakes. Thus the brakes upon the front and rear wheels are applied with equal pressure at any position of the foot pedal and fluid pressure passing through chambers 34 and 35 will have the same or equal effective force upon the double ended piston 26 to maintain the same in a neutral position.

As is well known, the wear on the front and rear wheel brakes is somewhat different and the equalizer cylinder 17 of my invention will prevent excessive braking effect occuring on one set of wheels in the event that brakes on the other set either wear more rapidly or are improperly adjusted after wear.

Assuming for the purpose of description that the application of the front wheel brakes will take effect slightly after the application of the rear wheel brakes; thus when the pedal 13 is depressed, the pistons 7 and 10 in the master cylinders 6 and 9 will produce a like or same fluid pressure in each of the systems of the front and rear wheel brakes for a predetermined movement of the brake pedal 13. As the rear wheel brakes are moved into braking engagement slightly before the front wheel brakes, the instant that the rear wheel brakes effect braking a further movement of the pedal 13 tends to rapidly build up a high pressure in the rear wheel brake system which includes chamber 35 to act upon cup 31 and piston 26 to force the same to the left with reference to Fig. 2 against the tension of the spring 33 and the fluid pressure in the chamber 34. This movement of the piston 20 to the left instantly overcomes the tendency of building up a high pressure in the rear wheel brake system and tends to build up the pressure in the front wheel brake system to instantly effect additional movement to the front wheel brakes to move them into braking engagement. The action of the piston 26 equalizes the pressure in the chambers 34 and 35 and as additional movement is given to the brake pedal 13 increasing and equal fluid pressures will be applied to the front and rear wheel brake systems to move the front and rear wheel brakes into positive braking engagement.

If the application of the rear wheel brakes takes effect slightly after the application of the front wheel brakes the piston 26 of the equalizer 17 will be moved to the right and effect a similar balance of fluid pressures as is apparent from the above description.

This movement of the piston 26 is necessary to provide for the varying differentials in adjustment between the front and rear wheel brakes and the recess 28 formed by the counterbores 29 in combination with the annular shoulder 27 on the piston permits a predetermined movement of the piston 26 to the right or left as the case may be. This movement, however, must be greater than the maximum differential in adjustment between the front and rear wheel brakes so as to eliminate the possibility of securing braking only on the pair of wheels in which the brakes necessitate the least movement.

In case of breakage of one of the conduits in either the front or rear wheel brake systems the fluid pressure therein reduces to substantially zero upon the application of the foot pedal 13, but the movement of the pedal will however effect fluid pressure in the wheel brake system which is intact and permit braking on one pair of wheels. The fluid pressure applied in the system which is intact will move the piston 26 in the equalizer 17 to its extreme right or left position with the annular shoulder 27 of the piston 26 engaging the shoulder formed by the counterbore 29 in the halves 18 and 19 to form a stop to limit the movement of the piston 26 in either direction.

In the modification of my invention illustrated in Figs. 4 to 7, inclusive, the master cylinders indicated generally by the characters 50 and 51 control respectively the front wheel brakes 52 and the rear wheel brakes 53 and are contained within a single housing 54 as is also the equalizer cylinder 55 and piston 55' therein as diagrammatically illustrated in Fig. 4. The housing 54 comprises a pair of parallel horizontally disposed cylindrical bores 56 and 56' in the lower portion of the same and have reciprocably mounted therein the master cylinder pistons 57 and 58. The pistons 57 and 58 comprise face portions 59 and 60 adapted to carry packing cups 61 and 62 and concave peripheries forming pockets 63 and 64 between the piston bodies and the walls of the cylindrical bores 56 and 56'. The upper portion of the housing 54 is provided with a partition or wall 65 which divides the same into two compartments 66 and 67 forming fluid reservoirs for the respective master cylinders 50 and 51. A suitable cover 68 is secured in position by screw bolts 69 having threaded engagement with tapped apertures in bosses 70 formed in the partition wall 65. The pockets 63 and 64 are in communication with the respective fluid reservoirs 66 and 67 through ports 71. A plurality of apertures 72 in the face portions 59 and 60 of the pistons provide communication from the pockets 63 and 64 to the rear of the cup packings 61 and 62. Fluid may pass through these apertures 72 upon the return stroke of the pistons 57 and 58 and by the peripheries of the respective packing cups 61 and 62 which will be flexed inwardly aided by a partial vacuum created in the bores as the retractile springs 73 and 74 force the respective pistons 57 and 58 rearwardly. Packing rings 75 and 76 supported at the rear of the pistons 57 and 58 prevent leakage of fluid from the pockets 63 and 64 by the rear of the pistons.

The pistons 57 and 58 are also provided with sockets 77 and 78 into which extend the plungers 79 and 80 by means of which the pistons may be moved. The plungers 79 and 80 are provided intermediate their ends with annular grooves 81 and 82 and a protective boot 83 having apertures 84 provided with annular beads 85 rests within these grooves 81 and 82 and clamping rings 86 engaging the lateral sleeve extensions 87 of the boot 83 secure the same to the plungers 79 and 80. A rearwardly extending rectangular shaped boss 88 integral with the housing 54 is provided with an annular groove 89 to receive the annular bead 89' of the boot 83 and a clamping ring 90' secures the same to the housing 54. Suitable yokes 90 secured to the threaded ends of the plungers 79 and 80 provide means for connecting the brake pedal 92 to the plungers and when actuated cause the simultaneous forward movement of the pistons 57 and 58.

At the discharge end of the master cylinders are double acting valve mechanisms indicated generally by the reference characters 93 and 94 and as each valve is of similar construction a description of one will suffice. The valve 94 cooperates with a flat ring shaped valve seat member 95 resting against the end wall of the cylinder. The valve 93 comprises a rigid inverted cup shaped member 96 having an annular flange 97 and the retractile spring 74 having one end resting against the flange 97 and its other end bearing against a washer 98 positioned between the cup 62 and the end of the spring 73 urges the member 96 forward and yieldingly seats the same against the ring member 95. A resilient cup shaped valve member 100 is fitted within the cup member 96 and apertures 101 in the wall of the member 96 are normally covered or closed by the wall of the resilient member 100 which may be flexed inwardly to uncover the apertures 101 under the influence of fluid pressure when the piston 57 is moved forward.

The outlet ports 102 and 103 of the respective master cylinders communicate with the equalizer cylinder 104 which is also contained within the housing 54 and comprises a cylindrical bore 105, the axis of which lies in the same plane as the axes of the master cylinders but at right angles thereto. The open ends of the cylindrical bore 105 are closed by plugs 106 which have threaded engagement with the internal threaded end portions of the bore. The double ended piston 55' is positioned in the bore 105 and comprises a body portion 109 having lugs 110 and 111 extending laterally from the respective end faces of the same. These lugs 110 and 111 are provided with enlarged end portions forming heads 112 and 113 which cooperate with protuberances 106' integral with the plugs 106 to permit a predetermined movement of the piston in either direction under the influence of fluid pressure. Packing cups 114 are associated with the respective ends of the piston 55' and are provided with central apertures 115 through which the lugs 110 and 111 extend. Flanges 116 extending inwardly about the openings 115 engage the lugs and outer laterally extending flanges 117 engage the wall of the cylindrical bore 105. Helical springs 118 resting between the packing cups 114 and the plugs 106 maintain the piston 55' in an intermediate normal position as indicated in Fig. 7. The packing cups 114 prevent leakage of fluid past the piston 55' from the respective fluid chambers 119 and 120 and the outlet ports 121 and 122 for the same lead respectively to the brake cylinders 123 of the front and rear wheel brakes as diagrammatically illustrated in Fig. 4.

When the brake pedal 92 is actuated the pistons 57 and 58 in the respective master cylinders 50 and 51 are moved forward under the influence of the plungers 79 and 80 to produce a pressure in the brake systems associated respectively with the front and rear wheel brakes. With the front and rear wheel brakes adjusted to effect braking pressure simultaneously the fluid pressure produced in the respective master cylinders 50 and 51 will cause fluid under pressure to pass through the respective outlet ports 102 and 103 of the same and into the chambers 119 and 120. As the brakes upon the front and rear wheels are applied with equal pressure at any position of the foot pedal 92 due to their adjustment the fluid pressure passing through the chambers 119 and 120 will have the same or equal effective force upon the double ended piston 55' to maintain the same in its intermediate or neutral position. The fluid under pressure passes through the outlet ports 121 and 122 of the respective chambers 119 and 120 to effect braking of the front and rear wheels as before described.

Applying the assumed condition in describing the function of the equalizer of Figs. 1 to 3, the depression of the pedal 92 will cause movement of the pistons 57 and 58 in the respective master cylinders 50 and 51 to produce an equal fluid pressure in the systems of the front and rear wheel brakes for a predetermined movement of the pedal. As the rear wheel brakes are moved into braking engagement slightly before the front wheel brakes, the instant that the rear wheel brakes effect braking a further movement of the pedal tends to rapidly build up a high pressure in the rear wheel brake system and chamber 120. This high pressure acts upon the piston 55' to force the same down with reference to Fig. 7 against the fluid pressure in the chamber 119 and the movement of the piston 55' instantly overcomes the tendency of building up a high pressure in the rear wheel brake system and tends to build up the pressure in the front wheel brake system to instantly effect additional movement to the front wheel brakes with the results as previously described.

The gap or space 130 between the protuberances 106' of the plugs 106 and the ends of the lugs 110 and 111 extending laterally from the respective end faces of the piston 55' permits a predetermined movement of the piston in either direction as the case may be. This movement however must also be greater than the maximum differential of adjustment between the front and rear wheel brakes as previously pointed out.

In case of breakage of one of the conduits in either the front or rear wheel brake systems the fluid pressure therein reduces to substantially zero upon the application of the brake pedal 92, but the movement of the same will however effect fluid pressure in the wheel brake system which is intact. The loss of fluid from the defective portion of the system has no effect upon the other portion of the system as each system is provided with a separate fluid reservoir as previously described. The piston 55' under such conditions is moved to its extreme up or down position with reference to Fig. 7 against either stop 106' as the case may be.

While I have illustrated and described several embodiments of my invention, it is to be understood that changes and modifications will readily suggest themselves and I therefore aim to cover all such changes and modifications as come within the spirit and scope of the appended claims.

1. In a hydraulic braking system, in combination a plurality of fluid operated brake mechanisms, a master cylinder and a piston therein for producing fluid pressure associated with each of the brake mechanisms, a cylinder and a piston therein common to said brake mechanisms and master cylinders, packing cups having central apertures seated on the opposite faces of said piston, heads on said piston extending through the apertures in said cups, means engageable with said heads for limiting the range of movement of said piston, coil springs interposed between said limiting means and said cups for holding said cups in a manner to prevent leakage of fluid through the apertures therein and for normally holding said heads spaced from said limiting means to permit a predetermined movement of said piston in either direction by a differential in pressure in said brake mechanisms due to variations in adjustment of the brake mechanisms to equalize the pressures therein.

2. In a hydraulic braking system, in combination a plurality of fluid operated brake mechanisms, a master cylinder and a piston therein for producing fluid pressure associated with each of the brake mechanisms, a common cylinder and a piston therein interposed between said master cylinders and brake mechanisms, packing cups having central apertures seated on the opposite faces of said piston, heads on said piston extending through the apertures in said cups, means engageable with said heads for limiting the range of movement of said piston, means yieldingly urging said piston to a position intermediate its limits of movement, such that the piston may be moved in either direction by a differential in pressure in said brake mechanisms due to variations in adjustment of the brakes of said brake mechanisms to equalize the pressures therein.

3. In a hydraulic braking system, in combination a plurality of fluid operated brake mechanisms, a master cylinder and a piston therein for producing fluid pressure associated with each of the brake mechanisms, a common cylinder and a double ended piston therein interposed between said master cylinders and brake mechanisms, acted upon simultaneously by pressures from said master cylinders, an annular shoulder on said piston and a recess in said cylinder means yieldingly urging said double-ended piston to a position intermediate its limits of movement cooperating to permit movement of said piston effected by a differential of pressure in said brake mechanisms caused by variations in brake adjustments of said brake mechanisms to equalize the pressures therein.

ERWIN F. LOWEKE.

CERTIFICATE OF CORRECTION.

Patent No. 1,941,563.    January 2, 1934.

ERWIN F. LOWEKE.

It is hereby certified that error appears in the printed specification of the above numbered patent requiring correction as follows: Page 4, lines 94, 95 and 96, claim 3, strike out the words "means yieldingly urging said double-ended piston to a position intermediate its limits of movement" and insert the same after "cylinders," in line 93, of said claim; and that the said Letters Patent should be read with this correction therein that the same may conform to the record of the case in the Patent Office.

Signed and sealed this 6th day of March, A. D. 1934.

F. M. Hopkins (Seal)    Acting Commissioner of Patents.

producing fluid pressure associated with each of the brake mechanisms, a cylinder and a piston therein common to said brake mechanisms and master cylinders, packing cups having central apertures seated on the opposite faces of said piston, heads on said piston extending through the apertures in said cups, means engageable with said heads for limiting the range of movement of said piston, coil springs interposed between said limiting means and said cups for holding said cups in a manner to prevent leakage of fluid through the apertures therein and for normally holding said heads spaced from said limiting means to permit a predetermined movement of said piston in either direction by a differential in pressure in said brake mechanisms due to variations in adjustment of the brake mechanisms to equalize the pressures therein.

2. In a hydraulic braking system, in combination a plurality of fluid operated brake mechanisms, a master cylinder and a piston therein for producing fluid pressure associated with each of the brake mechanisms, a common cylinder and a piston therein interposed between said master cylinders and brake mechanisms, packing cups having central apertures seated on the opposite faces of said piston, heads on said piston extending through the apertures in said cups, means engageable with said heads for limiting the range of movement of said piston, means yieldingly urging said piston to a position intermediate its limits of movement, such that the piston may be moved in either direction by a differential in pressure in said brake mechanisms due to variations in adjustment of the brakes of said brake mechanisms to equalize the pressures therein.

3. In a hydraulic braking system, in combination a plurality of fluid operated brake mechanisms, a master cylinder and a piston therein for producing fluid pressure associated with each of the brake mechanisms, a common cylinder and a double ended piston therein interposed between said master cylinders and brake mechanisms, acted upon simultaneously by pressures from said master cylinders, an annular shoulder on said piston and a recess in said cylinder means yieldingly urging said double-ended piston to a position intermediate its limits of movement cooperating to permit movement of said piston effected by a differential of pressure in said brake mechanisms caused by variations in brake adjustments of said brake mechanisms to equalize the pressures therein.

ERWIN F. LOWEKE.

CERTIFICATE OF CORRECTION.

Patent No. 1,941,563.  January 2, 1934.

ERWIN F. LOWEKE.

It is hereby certified that error appears in the printed specification of the above numbered patent requiring correction as follows: Page 4, lines 94, 95 and 96, claim 3, strike out the words "means yieldingly urging said double-ended piston to a position intermediate its limits of movement" and insert the same after "cylinders," in line 93, of said claim; and that the said Letters Patent should be read with this correction therein that the same may conform to the record of the case in the Patent Office.

Signed and sealed this 6th day of March, A. D. 1934.

F. M. Hopkins (Seal)  Acting Commissioner of Patents.